3,317,405
DISTILLATION APPARATUS WITH ULTRASONIC FREQUENCY AGITATION
Kenard D. Brown, 1227 S. Willow St., Casper, Wyo. 82601
Filed Oct. 21, 1965, Ser. No. 499,617
5 Claims. (Cl. 202—176)

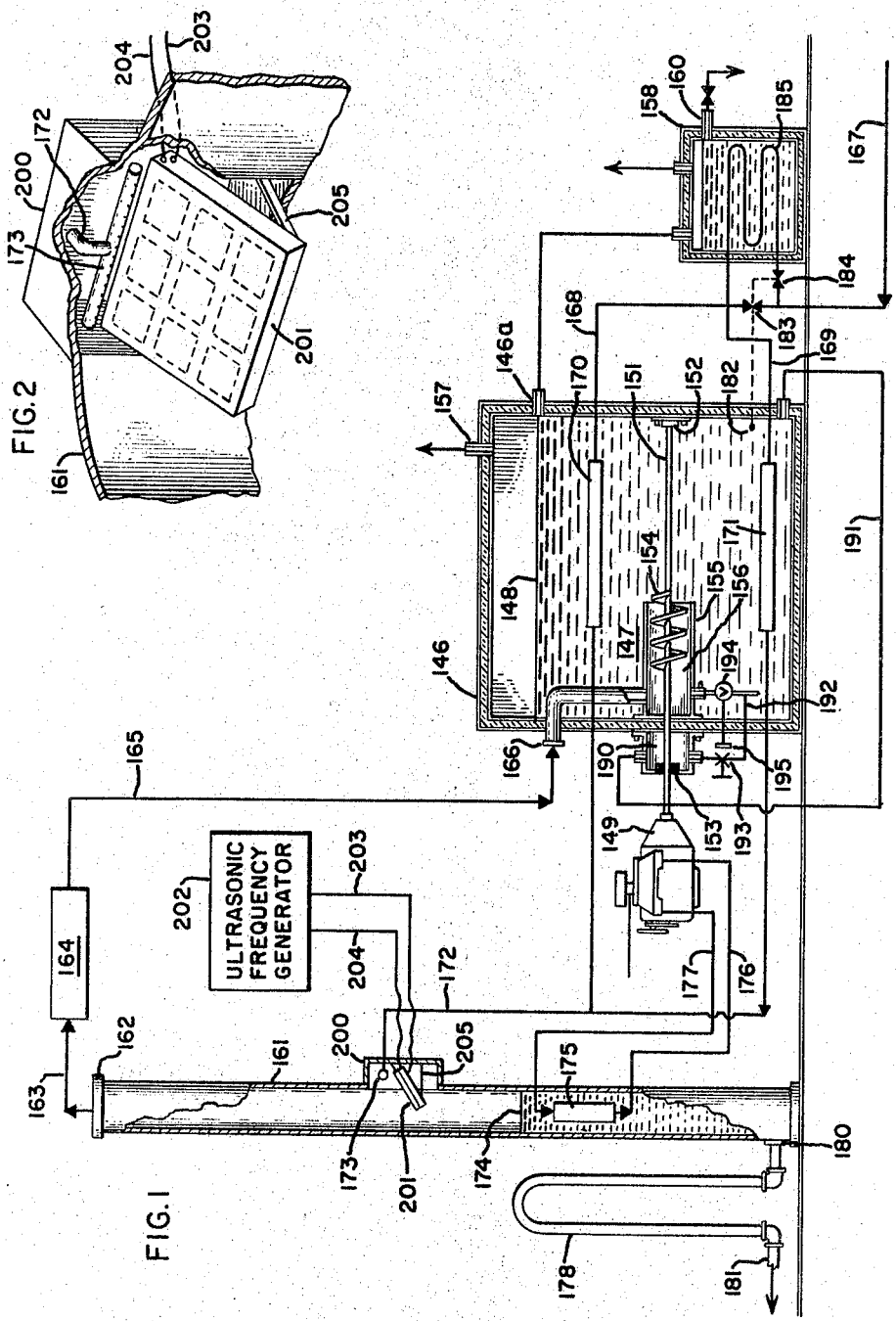

This application is a continuation-in-part of my co-pending application Ser. No. 418,112, filed Dec. 14, 1964, which is a division of my application Ser. No. 168,675, filed Jan. 25, 1962, now Patent No. 3,204,861, issued Sept. 7, 1965.

This invention relates to liquid purification systems employing vacuum evaporation and particularly to an improved arrangement for facilitating the rapid evaporation and purification of liquid.

Various systems have been provided employing evaporative processes for purifying liquids containing solids either dissolved or suspended therein. By way of example, evaporative systems are employed for the desalination of sea water and the like. Various arrangements have been employed in an attempt to maintain large volume flow of vapor at low pressures during the evaporating process.

It is an object of the present invention to provide an improved apparatus for effecting the evaporative separation of water and solids mixed or dissolved therein.

It is a further object of this invention to provide an improved evaporation and condensing apparatus for purifying liquids and which includes an arrangement for facilitating the more rapid evaporation of such liquids.

It is a still further object of this invention to provide an improved apparatus for effecting the evaporative purification of water on a large scale.

Briefly, in carrying out the objects of this invention in one embodiment thereof, a vacuum pump is provided for operation within a tank containing a body of purified liquid and is connected to an evaporative chamber to remove vapor from the chamber and to condense it and supply it to the body of liquid. The liquid to be purified which is supplied to the evaporative chamber is heated to facilitate evaporation and, in order to further increase the rate of evaporation, an ultrasonic transducer is arranged within the chamber and is energized to effect increased evaporation of liquid flowing over the transducer. The pump employed preferably comprises a combined liquid and vapor pump employing a rotor of the screw or helical type as disclosed in the aforesaid application and patent. Pumps of this type have been found particularly effective for handling large volumes of vapor.

The features of novelty which characterize this invention are set forth in the claims annexed to and forming a part of this specification. The invention itself, however, both as to its organization and method of operation, together with further objects and advantages thereof, will be better understood upon reference to the following description taken in connection with the accompanying drawing in which:

FIG. 1 is a somewhat diagrammatic view partly in section illustrating a water desalting system embodying the invention; and FIG. 2 is an enlarged perspective view of a portion of the system illustrated in FIG. 1.

Referring now to the drawings, the system illustrated in FIG. 1 includes a vacuum pump of the closed tank type similar to that described and claimed in the aforesaid applications. As illustrated, the vacuum pump of this system comprises a closed tank 146 having a rotary pump 147 mounted therein below the normal level of liquid indicated at 148. The pump 147 is driven by an internal combustion engine 149 having a shaft 151 mounted in bearings 152 and 153 and on which the helical rotor indicated at 154 is mounted. The rotor 154 rotates within a housing or shroud 155 which has an internal diameter substantially greater than that of the rotor and provides an inlet chamber 156 between the left-hand end of the housing and the left-hand end of the casing as shown.

During the operation of the system fresh or purified water collects in the tank 146 and is discharged through an overflow or outlet 146a, the tank being at atmospheric pressure as indicated by an outlet pipe 157. The overflowing fresh water collects in an accumulator or auxiliary tank 158 and is discharged therefrom for use through an overflow connection 160.

The pump system as just described is connected to evaporate water from an evaporating chamber comprising an upright tank or tower 161 the outlet of which is connected to a closed header 162 as indicated at 163 and conducts the vaporized water through a steam separator 164 and outlet conduit 165 to an inlet or suction connection 166 of the pump 147. The suction line 166 is connected to the pump 147 in communication with the chamber 156 as in the arrangements of the pumps previously described.

Salt water to be purified is admitted to the system through a supply line 167 and normally flows through conduits 168 and 169 through parallel heat exchangers 170 and 171 to a line 172 connected to supply salt water to the tower 161. The inlet line 172 terminates in a nozzle or head 173 within the tower 161 and delivers the liquid into the zone above the normal liquid level in the tower at 174. The nozzle 173 sprays the salt water into the tower where a portion of it is flashed immediately into vapor, the remainder falling to the body of liquid at the bottom of the tower; the tower is heated by a heat exchanger 175 connected in the liquid cooling system of the internal combustion engine 149 by lines 176 and 177; this cooling system circulates a suitable liquid heated by the engine block or exhaust gases or both. The tower 161 is maintained under a vacuum or low pressure by operation of the pump 147 and the withdrawn water vapor admitted to the pump is condensed by operation of the pump and added to the water within the tank 146. Any air or other noncondensible gases passing through the system may be removed through the outlet 157.

The tower 161 is made sufficiently tall that the suction pressure created by the pump 147 cannot draw liquid from the body of liquid within the tower into the exhaust line 163. The height to which water can be raised by operation of a vacuum is dependent upon the atmospheric pressure since it is to the difference between atmospheric pressure and pressure in the pump which determines the pressure difference tending to force the liquid water upwardly through the tower 161. It is necessary to remove the concentrated solution or salt water from the tank and for this purpose an inverted-U or siphon 178 is provided which is connected to the bottom of the tower 161 at 180 and to a discharge line at its other end as indicated at 181. The height of the inverted-U 178 is made sufficient to prevent the drawing of air into the system from the loop during operation of the pump at its lowest suction pressure; the siphon provides the overflow for excess liquid within the body in the tower 161 and thus maintains the normal level 174 of the liquid in the tower. The loop 178 thus provides an overflow for the tank while at the same time preventing the breaking of the vacuum pressure within the tower 161. The steam separator 164 is provided in the line 163 in order to retain particles of water which may reach the line 163 and allow them to evaporate before proceeding into the suction line 165.

During the operation of the system, should the temperature of the water within the tank 146 fall below a preselected value, a temperature sensing element 182 will cause operation of a pair of valves 183 and 184 to close the direct communication between the inlet 167 and the lines 168 and 169 and to open communication between the line 167 and a heat transfer coil 185 within the tank 158. Upon this change in the circuits the salt water to be treated passes through the coil 185 in the tank 158 and is heated by the water in this tank before proceeding through the heat exchangers 170 and 171 in the tank 146.

The system as illustrated also includes the sealing chamber for the bearing 153 as indicated at 190, this chamber being filled with water circulated from the tank 146 by operation of a supply line 191 connected to the lower portion of the tank 146 and conducting the liquid through the chamber 190 to a connection 192 under control of a hand valve 193. This circulated water is supplied to the intake side of a valve 193 which controls the recirculation of water from the tank 146 through the pump 147 in the same manner as the liquid intakes of the pumps described above.

During operation of the system the valve 194 is adjusted by a hand control indicated as a wheel 193 so that optimum conditions are realized. Under these conditions of operation low pressure is achieved in the suction line 166 and large amounts of heat are liberated into the water within the tank 146. This heat is available to heat the supply water and facilitate the flashing of the salt water into steam within the tower 161. Under optimum conditions the vortex formed by the helical rotor 154 acts effectively to withdraw and condense the steam passing through the inlet conduit 166, the steam not condensed within the shroud 155 being condensed shortly after emergizing from the shroud at the right end of the pump.

The system as illustrated in FIG. 1 makes it possible to provide effective pumping and evaporation of water from sea water and the like without requiring that moving parts of the system be located in the salt water and subject to the heavy corrosion resulting therefrom. In the present installation it will be noted that the pump and its bearings are all located where they are subject only to wetting by the fresh water produced by operation of the system.

In order to increase the rate of evaporation of liquid in the tank 161 the system as illustrated in FIGS. 1 and 2 is provided with an extension 200 of the chamber 161 and an ultrasonic energy transducer 201 is mounted therein. The transducer is arranged in the path of liquid from the distributing header 173 so that liquid flows over the transducer as it enters the evaporating chamber. The transducer 201 has been illustrated diagrammatically as comprising a rectangular body having a smooth flat upper surface. The transducer as indicated by the dotted lines in the drawing is provided with a plurality of piezoelectric crystals arranged in a mosaic. The faces of the crystals are mounted in a single plane and are covered and electrically connected by a layer of condcting material such as a thin deposit of metal (not shown). The outer surface of the transducer comprises a thin layer of suitable corrosion resistant material such as a synthetic resin, for example polystyrene, which seals the crystals and prevents their deterioration which might occur on contact with liquids. The opposite terminal of the crystal circuit is provided by a conducting plate (not shown) in contact with the back surface of the crystals.

The details of construction of the transducer have not been illustrated as they are not essential to an understanding of the present invention. It will be understood that a second terminal for the crystals is provided and that ultrasonic frequency electric energy is supplied to the crystals to energize them and produce ultrasonic vibrations of the transducer surface. The transducer is connected by suitable conductors, such as indicated at 203 and 204, to an ultrasonic frequency generator 202 which is operated to provide energy at the desired ultrasonic frequency. The transducer 201 is sloped downwardly to facilitate the flow of liquid over the transducer surface. The transducer 201 is mounted within the evaporator 161 on suitable supports or brackets one of which is indicated at 205.

During the operation of the system, when heated liquid supplied through the pipe 172 is admitted to the evaporating chamber 161 and flows over the surface of the crystal, the ultrasonic vibrations produced by the transducer cause evaporation of liquid which increases the rate of vaporization within the chamber 161 under influence of the low pressure produced by the pump 147. The rate of production of vapor is increased substantially and the overall effectiveness of the system is increased so that purified water may be produced at a greater rate with relatively little increase in the input energy required by the system, the amount of energy required for operation of the transducer 201 being relatively low as compared with the energy required by the prime mover 149 for driving the pump 147.

While the invention has been described in connection with a specific arrangement of the pumping unit and evaporation chamber, various other applications and modifications will occur to those skilled in the art. Therefore, it is not desired that the invention be limited to the specific construction illustrated and described and it is intended by the appended claims to cover all modifications which fall within the spirit and scope of the invention.

I claim:

1. A liquid purification system comprising means providing an evaporating chamber, a closed tank for containing a body of purified liquid, means including a pump for producing a low pressure in said evaporating chamber and for delivering evaporated liquid to said tank, means for supplying liquid for purification to said chamber, means for heating the liquid supplied by said last mentioned means, an ultrasonic energy transducer mounted in said chamber above the level of liquid therein, means for directing liquid supplied to said chamber onto the surface of said transducer, and means for generating ultransonic wave energy for energizing said transducer whereby at least a portion of the liquid flowing onto said transducer is evaporated by ultransonic energy to increase the rate of evaporation of liquid in said chamber, said pump for producing low pressure and for delivering evaporated liquid comprising a combined liquid and vapor pump arranged in said tank and having one inlet for withdrawing vapor from said chamber and a second inlet for circulating liquid in said tank, said heating means utilizing heat produced by operation of said pump.

2. A liquid evaporation system comprising means providing an evaporating chamber, a tank for containing a body of liquid substantially free of impurities, means including a combined liquid and vapor pump arranged in said tank and having a liquid inlet and a vapor inlet for circulating liquid in said tank and for withdrawing and condensing vapor from said chamber, means for driving said pump, flow control means for adjusting the flow of liquid through said pump, means for removing liquid from said tank, means for supplying liquid for evaporation to said chamber, an ultrasonic energy transducer mounted in said chamber above the level of liquid therein, means for directing the liquid supplied to said chamber onto the surface of said transducer, means for generating ultrasonic wave energy for energizing said transducer whereby at least a portion of the liquid flowing onto said transducer is evaporated by ultrasonic energy to increase the rate of evaporation of liquid in said chamber, means utilizing heat resulting from the operation of said pump for heating the liquid in said chamber, and means for removing concentrate from said chamber.

3. A liquid evaporation system as set forth in claim 2 wherein said pump comprises a substantially cylindrical casing closed at one end and open at its other end in communication with said tank and a helical rotor mounted in said casing for rotation on an axis lying longitudinally of said casing, the periphery of said rotor being spaced from the inner wall of said casing and said rotor being spaced from the closed end of said casing to provide an intake zone, said chamber being connected in communication with said zone through said vapor inlet to conduct vapor thereto and said flow control means admitting liquid from said tank to said zone through said liquid inlet.

4. A liquid purification system comprising means providing an evaporating chamber, a tank having a body of liquid therein, means for supplying to said evaporating chamber liquid to be purified, a combined liquid and vapor pump of the single screw type in said tank below the level of liquid therein for discharging fluid into said body of liquid below its level in said tank, means providing an intake chamber for said pump, means below the level of liquid in said tank for providing communication between said intake chamber and said tank and for admitting substantial quantities of liquid from said body to said pump, suction conduit means connected between said evaporating chamber and said intake chamber for providing a vapor inlet for said intake chamber, means for driving said pump, means for adjusting said communication means for controlling the rate of recirculation of liquid from said tank through said pump and thereby controlling the volume of liquid in said pump and the effective capacity of the pump, an ultrasonic energy transducer mounted in said evaporating chamber above the level of liquid therein, means for directing liquid supplied to said evaporating chamber onto the surface of said transducer, and means for generating ultrasonic wave energy for energizing said transducer whereby at least a portion of the liquid flowing over said transducer is evaporated by ultrasonic energy to increase the rate of evaporation of liquid in said evaporating chamber.

5. A liquid purification system comprising means providing an evaporating chamber, a tank having a body of liquid therein, means for supplying to said evaporating chamber liquid to be purified, means providing a substantially cylindrical chamber in said tank having one end in open communication with the interior of said tank and its other end closed, a pump rotor spaced from the closed end of said cylindrical chamber and mounted for rotation on a shaft substantially concentric with said chamber, a first inlet means connected between said evaporating chamber and said cylindrical chamber for admitting vapor to said cylindrical chamber in the space between said rotor and the closed end thereof, a body of liquid filling said tank to a level above said cylindrical chamber, a second inlet means for admitting liquid from said body to said space in said cylindrical chamber, means for driving said pump rotor to circulate liquid through said cylindrical chamber into said body of liquid below the surface thereof in said tank and to pump gas through said first inlet means and into said body of liquid, means for controlling the rate of flow of liquid through said second inlet means, an ultrasonic energy transducer mounted in said evaporating chamber above the level of liquid therein, means for directing liquid supplied to said evaporating chamber onto the surface of said transducer, and means for generating ultrasonic wave energy for energizing said transducer whereby at least a portion of the liquid flowing over said transducer is evaporated by ultrasonic energy to increase the rate of evaporation of liquid in said evaporating chamber.

References Cited by the Examiner

UNITED STATES PATENTS

| | | | |
|---|---|---|---|
| 453,386 | 6/1891 | Poterie | 202—182 X |
| 1,966,938 | 7/1934 | Stone | 203—26 |
| 2,358,559 | 9/1944 | Clemens | 203—11 X |
| 2,453,595 | 11/1948 | Rosenthal. | |
| 3,050,447 | 8/1962 | Olney | 203—91 |
| 3,206,380 | 9/1965 | Daviau | 202—185 |

NORMAN YUDKOFF, *Primary Examiner.*

F. E. DRUMMOND, *Assistant Examiner.*